(12) United States Patent
Cohen et al.

(10) Patent No.: US 7,418,492 B1
(45) Date of Patent: Aug. 26, 2008

(54) SYSTEM AND A METHOD FOR TESTING NETWORK COMMUNICATION DEVICES

(75) Inventors: Nimrod Cohen, Rehovot (IL); Guy Arieli, Alfey Menashe (IL)

(73) Assignee: P-Cube Ltd., Herzliya Pituach (IL)

( * ) Notice: Subject to any disclaimer, the term of this patent is extended or adjusted under 35 U.S.C. 154(b) by 1026 days.

(21) Appl. No.: 10/175,295

(22) Filed: Jun. 20, 2002

(51) Int. Cl.
G06F 15/173 (2006.01)

(52) U.S. Cl. ...................................... 709/224

(58) Field of Classification Search ......... 709/230–237, 709/203, 223–224; 714/25
See application file for complete search history.

(56) References Cited

U.S. PATENT DOCUMENTS

| | | | |
|---|---|---|---|
| 5,067,074 A | 11/1991 | Farel et al. | |
| 5,511,122 A | 4/1996 | Atkinson | |
| 5,689,508 A | 11/1997 | Lyles | |
| 5,826,014 A | 10/1998 | Coley et al. | |
| 5,841,775 A | 11/1998 | Huang | |
| 5,898,830 A | 4/1999 | Wesinger et al. | |
| 5,905,730 A | 5/1999 | Yang et al. | |
| 6,005,926 A | 12/1999 | Mashinsky | |
| 6,055,236 A | 4/2000 | Nessett et al. | |
| 6,072,800 A | 6/2000 | Lee | |
| 6,134,217 A | 10/2000 | Stiliadis et al. | |
| 6,182,226 B1 | 1/2001 | Reid et al. | |
| 6,185,680 B1 | 2/2001 | Shimbo et al. | |
| 6,208,652 B1 | 3/2001 | Stephens et al. | |
| 6,223,221 B1* | 4/2001 | Kunz ........................ | 709/224 |
| 6,304,913 B1 | 10/2001 | Rune | |
| 6,314,463 B1 | 11/2001 | Abbott et al. | |
| 6,335,927 B1 | 1/2002 | Elliott et al. | |
| 6,351,775 B1 | 2/2002 | Yu | |
| 6,389,473 B1* | 5/2002 | Carmel et al. ............. | 709/231 |
| 6,397,335 B1 | 5/2002 | Franczek et al. | |
| 6,502,135 B1 | 12/2002 | Munger et al. | |
| 6,513,122 B1 | 1/2003 | Magdych et al. | |
| 6,708,213 B1* | 3/2004 | Bommaiah et al. .......... | 709/226 |
| 6,725,378 B1 | 4/2004 | Schuba et al. | |
| 6,789,203 B1 | 9/2004 | Belissent | |
| 6,829,391 B2* | 12/2004 | Comaniciu et al. .......... | 382/243 |

(Continued)

FOREIGN PATENT DOCUMENTS

JP  11184780 A  *  7/1999

(Continued)

OTHER PUBLICATIONS

Bennett, J.C.R. et al. "Hierarchical Packet Fair Queueing Algorithms", 1996.

(Continued)

*Primary Examiner*—Jason Cardone
*Assistant Examiner*—Thomas Duong
(74) *Attorney, Agent, or Firm*—Abelman, Frayne & Schwab (57) ABSTRACT

The present invention is a system and method for efficient and flexible testing of data communication over computer networks. The system generates traffic streams and sends them to at least one server, and receives in return replying traffic streams. Traffic outgoing streams are generated in accordance with test parameters set by a test session creator. The system generates and receives dynamic traffic streams, and further has the capability to control the traffic rate of the reply traffic streams.

15 Claims, 5 Drawing Sheets

U.S. PATENT DOCUMENTS

| | | | | |
|---|---|---|---|---|
| 6,965,993 | B2* | 11/2005 | Baker | 713/153 |
| 7,231,420 | B2* | 6/2007 | Bach Corneliussen | 709/203 |
| 2001/0042200 | A1 | 11/2001 | Lamberton et al. | |
| 2002/0083175 | A1 | 6/2002 | Afek et al. | |
| 2002/0131496 | A1* | 9/2002 | Vasudevan et al. | 375/240.11 |
| 2002/0136298 | A1* | 9/2002 | Anantharamu et al. | 375/240.12 |
| 2002/0161913 | A1* | 10/2002 | Gonzalez et al. | 709/233 |
| 2003/0069957 | A1* | 4/2003 | Malmskog et al. | 709/223 |
| 2003/0070096 | A1 | 4/2003 | Pazi et al. | |
| 2003/0110274 | A1 | 6/2003 | Pazi et al. | |
| 2003/0208616 | A1* | 11/2003 | Laing et al. | 709/236 |
| 2003/0233445 | A1* | 12/2003 | Levy et al. | 709/224 |
| 2006/0083165 | A1* | 4/2006 | McLane et al. | 370/229 |

FOREIGN PATENT DOCUMENTS

| | | |
|---|---|---|
| WO | WO 02/33870 | 4/2002 |

OTHER PUBLICATIONS

Bennett, J.C.R. et al. "High Speed, Scalable, and Accurage Implementation of Fair Queueing Algorithms in ATM Networks", 1996.

Bennett, J.C.R. et al. "WF2Q: Worst-Case Fair Weighted Fair Queueing", 1996.

Chiussi, F.M. et al. "Implementing Fair Queueing in ATM Switches: The Discrete-Rate Approach", 1998.

Chiussi, F.M. et al. "Minimum-Delay Self-Clocked Fair Queueing Algorithm for Packet-Switched Networks", 1998.

Demers, A. et al. "Analysis and Simulation of a Fair Queueing Algorithm", 1989 Association for Computing Machinery.

Eckhardt, D.A. et al. "Effort-limited Fair (ELF) Scheduling for wireless Networks", IEEE INFOCOM 2000.

Golestani, S.J. "Networks Delay Analysis of a Class of fair Queueing Algorithms", IEEE Journal on Selected Areas in Communications, vol. 13, No. 6, Aug. 1995, pp. 1057-1070.

Golestani, S.J. "A self-Clocked fair Queueing Scheme for Broadband Applications", IEEE 1994, pp. 5c.1.1-5c1.11.

Greenberg, Albert G. et al. "How Fair is Fair Queuing?" Journal of the Association for Computing Machinery vol. 39, No. 3, Jul. 1992, pp. 568-598.

Parekh, A.K.J. "A Generalized Processor Sharing Approach to Flow Control in Integrated Services Networks", Ph.D. Dissertation Massachusetts Institute of Technology, Feb. 1992.

Parekh, A.K.J. "A Generalized Processor Sharing Approach to Flow Control in Integrated Services Networks: The Multiple Node Case", IEEE/ACM Transactions on Networking vol. 2, No. 2, Apr. 1994, pp. 137-150.

Parekh, A.K.J. "A Generalized Processor Sharing Approach to Flow Control in Integrated Services Networks: The Single-Node Case", IEEE/ACM Transactions on Networking vol. 1, No. 3, Jun. 1993, pp. 344-357.

"Quality of Service Networking", downloaded from the web (address: http://www.cisco.com/univercd/cc/td/doc/cisintwk/ito_doc/qos.htm), Cisco Systems, Inc. 2002.

Rexford, J.L. et al. "Hardware Efficient Fair Queueing Architectures for high-Speed networks", IEEE 1996, pp. 5d.2.1-5d.2.9.

Shreedhar M. et al. "Efficient Fair Queueing Using Dificit Round-Robin", IEEE/ACM Transactions on networking vol. 4, No. 3, Jun. 1996, pp. 375-385.

Stiliadis, D. et al. "Frame-Based Fair Queueing: A New Traffic Scheduling Algorithm for Packet-Switched Networks", Jul. 1995, pp. 1-43.

Mockapetris, "Domain Names—Implementation and Specification", RFC 1035, 1987.

D. Eastlake, "Domain Name System Security Extensions", RFC 2535, Mar. 1999.

Mockapetris, "Domain Names—Concepts and Facilities", RFC 1034, 1987.

* cited by examiner

SYSTEM AND A METHOD FOR TESTING NETWORK COMMUNICATION DEVICES

FIELD OF THE INVENTION

The present invention relates generally to testing systems of communication networks. More specifically, the present invention relates to the testing of computer protocols, which facilitate network communications.

BACKGROUND OF THE INVENTION

Computer networks have grown increasingly complex, employing technologies such as distributed client/server applications, mixed platforms and multiple protocols, all on a single physical backbone. A trend which has added to the abovementioned complexity of the networks is the shifting of traffic control methods on the networks from centralized information system departments to distributed workgroups. Another catalyst of the increased complexity is the growing utilization of computer networks. This growth of utilization is what also makes the operation of computer networks more mission critical for day-to-day business operations.

Computers which are part of a computer network such as the abovementioned networks, communicate with each other by means of protocols based on the Open Systems Interconnection model ("OSI"). The OSI model is an internationally accepted framework of standards for communication between different systems manufactured by different vendors. The OSI model creates an open system networking environment in which any vendor's computer system, connected with any network, can freely share data with any other computer system on that network, or on a linked network. The OSI model defines seven layers of communication with which all devices must comply.

Data transfers between servers and clients in a computer network are performed through switches, routers, or gateways. Routing and switching functions are provided by layers 1 through 3 of the abovementioned OSI model. Layers 4 through 7 of the OSI model deal with end-to-end communications between a source computer sending data ("source") and a destination computer, which should eventually receive the data ("destination").

In order to ensure reliable traffic flow between sources and destinations within a network, and from a source in one network to a destination in another network, it is important to provide a testing system for testing the various network components responsible for the proper routing and channeling of traffic within networks and between networks ("system under test" or "SUT" e.g. servers, switches, routers, gateways, systems for wire-speed application layer classification of data packets, and pre-processing of data packets in a full duplex network).

Testing systems are connected with the SUT either directly, or through various network components that are responsible for performing network management functions such as network restoration, customer servicing, circuit testing, and call monitoring, through which nodes the test machines perform their tests.

Most testing systems are implemented on the third layer of the OSI model (the "network layer"). There are also known in the art testing systems that are implemented on the seventh layer of the OSI model (the "application layer").

The advantage of using application layer testing systems ("ALTS") is that when running a test which is initiated in the application layer, all other layers participate in the process, and are therefore testable, whereas when using a network layer testing system ("NLTS") the test sequence begins at the network layer, and therefore only layers 1-3 participate in the testing process.

Application layer testing systems are used for testing of the protocols that provide the actual service sought by an end user of a computer connected to a network, and these protocols can only be tested by means of application layer test machines. These examples of service protocols include hypertext transfer protocol ("HTTP"), file transfer protocol ("FTP"), simple mail transport protocol ("SMTP"), real time streaming protocol ("RSTP"), and others.

In general, for the purpose of testing a SUT, application layer testing systems generate traffic streams, which require the use of the specific protocol being tested (e.g. e-mail messages when the SMTP protocol is being tested). Once generated, these traffic streams are sent to a remote destination in the network for the purpose of testing the network component involved in the process of handling the generated traffic. The traffic streams are routed through the network according to unique network addresses (e.g. IP address).

The test results (i.e. success or failure) are determined according to the feedback returned from the SUT, which is gathered by a monitor program, probing the SUT, and from other network components that took part in handling the generated traffic.

As mentioned hereinabove, currently available test machines provide reports only as to the success or the failure of each test, but they do not provide any additional details regarding the results of the test.

Generally speaking, testing systems are capable of generating two different types of traffic streams, dynamic test traffic, and static test traffic, each by means of a different protocol. For the purpose of sending dynamic traffic testing systems use the transmission control protocol ("TCP"). For the purpose of sending static test traffic the testing system uses the user datagram protocol ("UDP"). Each of these types of test traffic has its own unique properties, as follows:

Static test traffic enables the testing system to send the test traffic at varying traffic rates (i.e. to control the traffic rate, usually measured in bps, of the traffic streams used in the test), but it can not interact with the destination network component, nor with any other network component participating in the channeling of the generated traffic stream. Therefore no acknowledgement information is received from these network components. In addition, even when generating a static traffic stream, the different rates from which a user of the testing system can choose are discrete, rather than continuous (e.g. a user can only choose from the following three traffic rates: 5 bps, 10 bps, or 15 bps). In contrast, a testing system generating a dynamic traffic stream can interact with the destination network component, or with any other network component participating in the channeling of the generated traffic stream, but it cannot control the traffic rate during a test session.

The dynamic characteristics of the dynamic traffic generated by the testing system are generic and inherent to the standard TCP/IP mechanisms, and are not unique to the testing system (i.e. the information regarding the acknowledgment of traffic in the network is automatically generated by the TCP protocol, and is sent from the destination network component, or from any other network component participating in the channeling of the generated traffic stream to the client that generated the stream). These dynamic characteristics does not exist as part of the UDP protocol, which enables control over the traffic rate.

Interacting with the destination network component, or with any other network component participating in the channeling of the generated traffic stream is desirous since it enables retrieving of acknowledgement information regarding the test traffic. Controlling the traffic rate is desirous for the purpose of being able to test the SUT under different loads of traffic.

Currently, no known testing system can generate test traffic which has the characteristics of both the dynamic and the static traffic streams. Moreover, the known dynamic traffic testing systems that generate dynamic traffic don't use the full acknowledgement information received in return, only providing the basic responses of failure or success of a certain test.

Furthermore, no known testing systems are capable of sending test traffic to a large number of servers during a single test session, a property which is desirable for the purpose of testing of vast loads, or for the purpose of testing of more than one protocol in a single test session.

Therefore, there is a need for a testing system capable of generating test traffic that has both dynamic characteristics and static characteristics, and that will further query the full acknowledgement information of the test traffic for more detailed results regarding the acknowledgement of the test traffic (e.g. number of bytes sent, number of packets that were transmitted, and the number of packets that were received, including their serial number etc.), and that is further capable of communicating with more than one destination server during a test session.

SUMMARY OF THE PRESENT INVENTION

Thus, it is an object of the present invention to provide a testing system and a method having the capability of generating a dynamic test traffic stream, while maintaining the user's capability to control the dynamic test traffic's rate.

It is yet another object of the present invention to provide a testing system and a method that will enable a user of a testing system to choose a traffic rate from a continuous range of options.

It is yet another object of the present invention to provide a testing system and a method that produces reports which include detailed information about the test results.

It is yet another object of the present invention to provide a system and a method that produces an independent report for each SUT.

It is yet another object of the present invention to provide a testing system and a method capable of interacting with a plurality of destination servers during a single test session.

These objects, and others not specified hereinabove, are achieved by the present invention, an exemplary embodiment of which is an application layer testing system for testing communications between network components, comprising a test manager, a database connected with the test manager, and a plurality of traffic nodes also connected with the test manager by means of a switch. Each of the plurality of traffic nodes has at least one traffic node buffer. The testing system is connected with a network component to be tested. The testing system generates dynamic test traffic streams that are actually traffic requests sent to a destination server. The destination server receives these traffic requests, and replies with dynamic test traffic streams of its own, sent to the traffic node that sent the request. The testing system has the capability to control the rate of the test traffic sent from the destination server to the traffic node while maintaining the dynamic characteristics of the traffic.

DETAILED DESCRIPTION OF THE INVENTION

Figure 1:
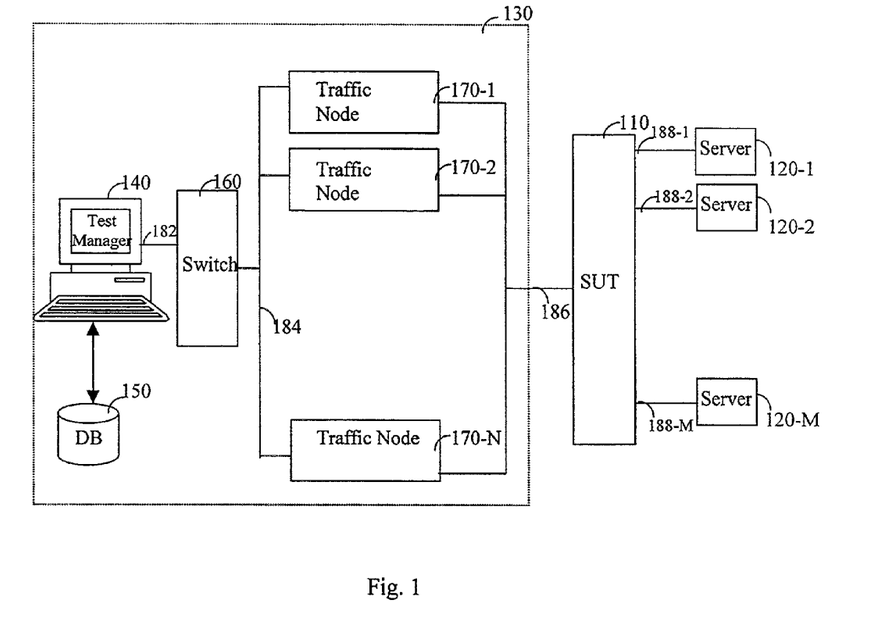
FIG. 1 is a block diagram of a testing system in accordance with an exemplary embodiment of the present invention.

Reference is now made to FIG. 1 where a non-limiting exemplary embodiment of the present invention is shown. SUT 110 and a plurality M of destination servers $120_1$, through $120_M$ (hereinafter "$120_{1-M}$") are parts of a communication network, which is tested by testing system 130. Destination servers $120_{1-M}$ receive traffic streams generated by testing system 130, and return traffic streams requested by the stream of testing system 130. The type of stream sent by testing system 130 and in response, by destination servers $120_{1-M}$ depends on the protocol being tested as will be explained hereinafter. In addition to the response traffic stream, destination servers $120_{1-M}$ also send a feedback to testing system 130, comprising a set of packets containing information required for the acknowledgement of the transmission, which includes the number of bytes (or packets) sent by a destination server from destination servers $120_{1-M}$, and the ID number of each transmitted packet ("acknowledgement information"), which is later used by testing system 130 for determining the outcomes of the test session, and consequently, for the generation of detailed reports. Other parts of network are not presented, as they do not take part in the operation of testing system 130, and are therefore irrelevant for the explanation of the present invention, but such parts might typically include clients, routers, gateways etc.

Testing system 130, comprises a test manager 140, a database 150 in communication with test manager 140, a plurality N of traffic nodes $170_1$ through $170_N$ (hereinafter "$170_{1-N}$") and a switch 160 that connects between test manager 140 and nodes $170_{1-N}$. Each of traffic nodes $170_{1-N}$ is connected with communication 186, by means of which testing system 130 is connected with the SUT 110.

Types of destination servers $120_{1-M}$ include SMTP servers, HTTP servers, FTP servers, and others. The components of testing system 130, as well as the other components of the tested network shown in FIG. 1 are interconnected and communicate with each other by means of known communications 182, 184, 186 and $188_{1-M}$. Examples to these standard communications include, but are not limited to, local area network ("LAN"), wide area network ("WAN"), Infiniband, fast Ethernet etc.

Test manager 140 is a computer platform having input and output devices, running a managing software with which the user initiates test sessions, and also queries the acknowledgement information sent by destination servers $120_{1-M}$ to traffic nodes $170_{1-N}$ generates test reports that are based on the acknowledgment information, all as will be explained hereinafter.

Traffic nodes $170_{1-N}$ are responsible for transmitting and receiving the traffic streams used in a test session, and for receiving the acknowledgement information generated by destination servers $120_{1-M}$.

Switch 160 is a generic switch that manages the connections between test manager 140 and traffic nodes $170_{1-N}$.

Database 150 can serve two purposes: (1) saving settings of previously performed tests for future reuse, allowing a user to repeat a test at a later time simply by calling the previously saved test settings from database 150, rather than having to insert the test parameters all over again; (2) saving the results of a test session generated by test manager 140, where they are kept available for the user. The user retrieves information from database 150 by means of test manager 140.

In accordance with the disclosed embodiment of the present invention, testing system 130 is connected directly with SUT 110. In accordance with an alternative embodiment of the present invention, testing system can be connected directly with destination servers $120_{1-M}$, or with a specific destination server 120 of destination servers $120_{1-M}$, in which case testing system 130 will require an additional component that will perform the functions of SUT 110, but which is integral with testing system 130. This alternative embodiment may be desired when a user of testing system 130 ("user") wishes to focus his test session on a specific, more narrow, portion of the tested network.

Testing system 130 is an ALTS. Due to that fact, only layer 7 protocols can be tested by testing system 130 during a test session.

Testing system 130 is capable of testing a plurality of protocols of different types in a single test session. A test session that tests a plurality of protocols may comprise the following sequence (for example)—
1. Test HTTP protocol, version 1.0.
2. Test FTP protocol.
3. Test SMTP protocol.

A traffic node 170 that receives this test session sequence executes each of the steps of the sequence and accordingly generates traffic streams that correspond with the tested protocols (e.g. for the purpose of testing the SMTP protocol, the traffic node generates and receives e-mails, and for the purpose of testing the FTP protocol the traffic node requests a file from destination server 120, or sends a file thereto).

A test session begins with the insertion by the user of the input test parameters required for the performance of a test session into test manager 140, and ends with the generation of a report detailing the test session's results, as will be explained in this detailed description.

The user enters the abovementioned test parameters by means of a graphical user interface ("GUI"), by means of which the user operates test manager 140. Alternatively, any suitable user interface may be used.

In accordance with an exemplary embodiment of the present invention, test parameters input by the user into test manager 140 include the application layer protocol type being tested (e.g. FTP, HTTP, SMTP etc.), the tested protocol's version, the IP address of traffic node $170_{1-N}$ to be used for the current test session, the IP addresses of the destination servers $120_{1-M}$ (one IP address or more) that will receive the traffic stream from the traffic node 170, test time frame, number of bytes of data to transfer during the test session, the number of times the test session is to be repeated and the type of browser used. An additional parameter that the user inserts is the desired traffic rate (in bps), which can be any value larger than zero. These test parameters are then encapsulated into a software object ("session object"), and sent to the designated traffic node 170 by test manager 140. In other exemplary embodiments, the user may be required to input only a few of the above-mentioned test parameters.

Each traffic node 170 has a range of IP addresses of destination servers $120_{1-M}$ that it can reach. The user designates a specific traffic node 170 according to the destination server 120 with which he wishes to interact during the test session. The user selects the desired traffic node 170 from a menu of traffic nodes $170_{1-N}$ presenting all of the available traffic nodes $170_{1-N}$. During the abovementioned initial stage of inserting the test parameters, after the user selects a traffic node 170, he chooses a destination server 120 from the destination servers $120_{1-M}$ that interact with the previously selected traffic node 170, again, from a menu of available destination servers 120. The traffic node $170_{1-N}$ menu and the destination servers $120_{1-M}$ menu are part of the abovementioned GUI.

The traffic node 170 that was designated by the user (hereinafter "designated traffic node 170"), receives the session objects from test manager 140, generates a test traffic stream in accordance therewith, and sends the test traffic stream to the destination server 120 that was designated by the user (hereinafter "designated destination server 120").

The test traffic stream generated by designated traffic node 170 according to the session object is sent to the designated destination servers 120, through SUT 110. As abovementioned, the test traffic stream sent by designated traffic node 170 is actually a request to the designated destination server 120 to send a corresponding test traffic stream back to designated traffic node 170. Since all of the transportation of traffic during the test session is performed by means of the TCP/IP protocol, this traffic is dynamic.

Designated destination server 120 receives the test traffic stream generated and sent by designated traffic node 170, and responds in accordance with the protocol being tested. For example if a file transfer protocol ("FTP") is tested, designated traffic node 170 generates a test traffic stream, which is a request posted to a designated destination server 120, which is an FTP server, to transmit a certain file back to the requesting traffic node 170. FTP designated destination server 120, after receiving the test traffic stream, opens an FTP session with the requesting designated traffic node 170, and sends the requested file to the requesting designated traffic node 170, along with the traffic's acknowledgement information.

Each of traffic nodes $170_{1-N}$ is enabled to create a plurality of test sessions with a plurality of destination servers $120_{1-M}$. Also, traffic nodes $170_{1-N}$ are enabled to interact with a large number of destination servers $120_{1-M}$ during a single test session, thereby enabling testing system 130 to test a variety of protocols during a single test session, and also to test extreme load situations.

As mentioned hereinabove, at the beginning of a test session, one of the test parameters inserted by the user is the desired traffic rate. Throughout the test session, the actual rate of traffic between traffic node 170 and designated destination server 120 traffic, in either or both directions (i.e. destination server 120 to traffic node 170 and traffic node 170 to destination server 120), traffic is controlled by testing system 130 to adhere with the user's desired traffic rate, as will be explained further below.

Figure 2A:
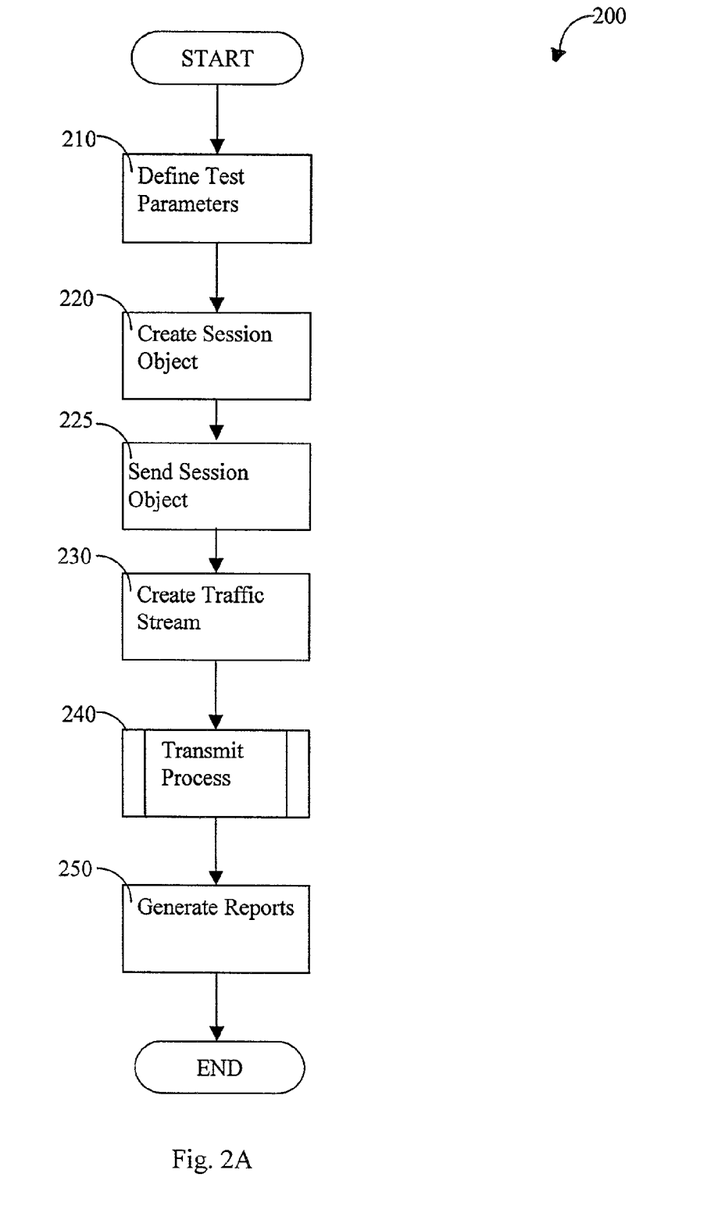
FIG. 2A is a flow chart describing a test sequence in accordance with an exemplary embodiment of the present invention.

Reference is now made to FIG. 2A, which is a flowchart, describing the steps of a test session 200 in accordance with the disclosed embodiment of the present invention.

In step 210 the user inputs the test parameters by means of test manger 140.

In step 220, test manger 140 encapsulates the test parameters input by the user in step 210 into a session object.

In step 225, the session object created by test manager 140 is sent by test manager 140 to one of traffic nodes $170_{1-N}$ that was previously designated by the user in step 210.

In step 230, designated traffic node 170 that received the session object, generates a test traffic stream in accordance with the parameters defined within the session object.

In step 240, designated traffic node 170 transmits the generated test traffic stream to a corresponding designated destination server 120, according to the IP address of the destination server 120, defined in the session object. The test traffic stream is transmitted to designated destination server 120 via SUT 110. A more detailed description of the transmit process procedure 240 follows hereinbelow.

Figure 2B:
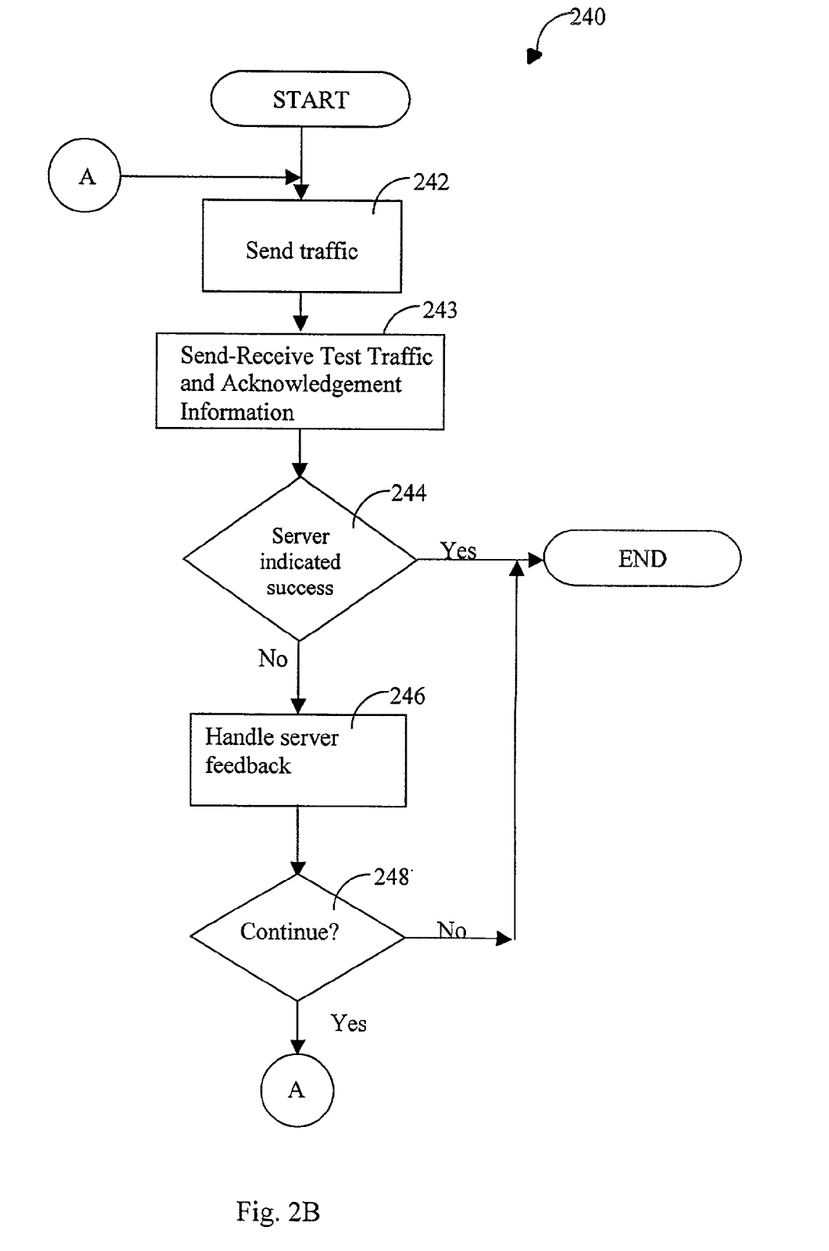
FIG. 2B is a flow chart describing the transmit process that is one of the stages of the test sequence in accordance with an exemplary embodiment of the present invention.

Reference is now made to FIG. 2B, which is a flowchart illustrating the transmit process procedure 240.

In step 242, designated traffic node 170 sends a test traffic stream to the designated destination server 120, through SUT 110. As mentioned hereinabove, this test traffic stream is a traffic request posted to designated destination server 120 (e.g. a request to designated destination server 120 to transmit a response test traffic stream back to designated traffic node 170. The response test traffic stream can be any type of data, depending on the protocol being used).

In step 243, the designated destination server 120 sends designated traffic node 170 the requested test traffic and the acknowledgement information thereof. As mentioned hereinabove, sending such acknowledgement information is inherent to the TCP/IP protocol. On the designated traffic node 170 side, designated traffic node 170 receives the response test traffic and the acknowledgement information.

In step 244, based upon the acknowledgement information sent by designated destination server 120, designated traffic node 170 checks if the actual test traffic sent by designated destination server 120 reached designated traffic node 170.

If the comparison of the acknowledgement information sent from designated destination server 120 with the actual traffic generated by designated destination server 120 and received by designated traffic node 170 indicates success, process 240 ends, and step 250 occurs. If, on the other hand, the comparison of the acknowledgement information with the actual test traffic generated by designated destination server 120 and received by designated traffic node 170 indicates that an error occurred during the transmission (e.g. the feedback indicates that not all bytes transmitted by designated destination server 120 were received by designated traffic node 170), then, in step 246, designated traffic node 170 handles the feedback received from designated destination server 120 using the acknowledgement information handling mechanism inherent to the TCP/IP protocol, in the following manner. The TCP/IP protocol can respond to such acknowledgement information in one of the following four alternatives. The first alternative is to request designated destination server 120 to retransmit lost packets from the last received packet number onwards. The second alternative is requesting designated destination server 120 to retransmit the entire set of packets (i.e. not just from the lost packet onwards). The third and fourth alternatives are actually variations of the first two. According to the third and fourth alternatives, in addition to requesting from designated destination server 120 to execute one of the first two alternatives, the TCP/IP protocol acknowledgement information handling mechanism can opt to resend the requested packets at a reduced rate for the purpose of ensuring that the requested packets reach their destination, as is commonly done in digital computer networks.

Once the handling mechanism of the TCP/IP protocol resolved its alternative, designated destination server 120 is informed as to the selection, and responds accordingly, with the resending of the requested packets to designated traffic node 170.

In step 248, after designated destination server 120 has resent the requested packets and the corresponding acknowledgement information, designated traffic node 170 checks if designated destination server 120 retransmitted the lost packets according to the acknowledgement information (i.e. designated traffic node 170 checks if the previously missing packets were retransmitted and received correctly). If so, designated traffic node 170 continues execution of the test (i.e. continuing with the transmission of the rest of the packets comprising the test traffic, which chronologically comes after the retransmitted packets). If, on the other hand, designated destination server 120 does not respond, procedure 240 ends with the determination that the result of the test session is failure, and step 250 occurs, as will follow.

Hence is an example of the operation of procedure 240. For the purpose of the example, the protocol tested is FTP protocol. In such a test, designated traffic node 170 requests a designated destination server 120, which is an FTP server to open an FTP session, and to transfer a designated file back to designated traffic node 170 (step 230). The designated FTP destination server 120 responds by transmitting the designated file back to the designated traffic node 170, along with the acknowledgement information (step 242). Designated traffic node 170 receives the file, which is sent as packets of data (step 243), and checks if these packets belong to the designated file by comparing the received packets with the acknowledgement information (step 244). If some packets are lost, designated traffic node 170 requests the designated FTP destination server 120 to resend the missing packets, or to act in any of the above-mentioned manners (e.g. resending all of the packets and/or resending the packets in reduced rate) (step 246).

At the end of every test session, once step 240 ends, step 250 occurs, in which testing system 130 generates a test report.

In step 250, after the test is completed, and test results are generated, test manager 140, which monitors the status of the test throughout the test session, queries designated traffic node 170 for the acknowledgement information, derives the test results therefrom, and stores the results in database 150. Based on the test results, test manager 140 generates a corresponding report. The report includes information regarding the test's outcome, the total number of bytes transmitted during the test session, the average bandwidth used during the test session, and the number of bytes transmitted per time frame. Actually, any information generated by the TCP/IP protocol due to its dynamic characteristic and returned to designated traffic node 170 as acknowledgement information can be retrieved by test manager 140 and inserted into the test report.

A report is generated for each designated destination server 120, and displayed in a graphical or textual manner.

As abovementioned, although the aforesaid speaks in singular with respect to designated traffic node 170 and designated destination server 120, it should be specifically noted that testing system 130 also enables a user to designate a plurality of traffic nodes 170 and/or a plurality of destination servers 120 in a single test session.

In accordance with the disclosed embodiment of the present invention, testing system 130 also has the capability of controlling the rate at which the test traffic streams generated during a test session are transferred between destination servers 120 and traffic nodes 170, both in the direction of traffic node 170 to destination server 120 (synonym to client to server direction) and vice versa, while using the TCP/IP protocol, therefore maintaining the dynamic characteristics of the test traffic stream.

In a client-server model in a network using the TCP/IP protocols ("client-server model"), from the client's point of view, controlling the rate in which the client transmits traffic to the server is straightforward. One method of doing so is simply by specifying the number of outgoing bytes to be transmitted per second (e.g. by adjusting this parameter by means of the operating system etc.).

On the other hand, controlling the rate at which a server transmits the traffic to the client is not that straightforward from the client's point of view. The present invention provides a method for obtaining said control on the rate of traffic going from the server to the client, from the client's side, while maintaining the traffic's dynamic characteristics. The implementation of this capability to control the rate of server-client traffic while maintaining the traffic's dynamic characteristics in accordance with an exemplary embodiment of the present invention is based on the method for transferring data in a client-server model.

There follows a description of the abovementioned method for transferring a traffic stream in accordance with the TCP/IP protocol, which will be followed by an explanation of algorithm 300, which is the procedure used to control the server-client traffic rate in accordance with an exemplary embodiment of the present invention.

Generally, in the TCP/IP protocol, when transferring bytes of data between a client and a server (clients and servers will be referred to in general as "nodes"), packets sent from one node to the other are written to a buffer on the receiving node as a stream of data (i.e. when the direction of the communication is from the server to the client, the server writes the data into the client's buffer and vice versa). The sending node continues to write data to the receiving node's buffer only as long as the receiving node's buffer is not full. If the receiving node's buffer is full, the receiving node sends a message to the server that includes the buffer status, and until the buffer is sufficiently emptied, no additional data can be written to that buffer. For instance, if the receiving node's readings from its buffer are infrequent, the buffer will be full for longer periods of time, at which periods the sending node will stop sending traffic, and the overall traffic rate will be lower (e.g. a server transmits 1,000 bps. The client's buffer size is 1,000 bytes. The goal is to achieve a traffic rate of 500 bps. Server transmits for 1 second, after which the client's buffer is full, and transmission stops. The client waits one second and then reads from its buffer. Over this period of 2 seconds, the rate of traffic was 500 bps since at the It second 1,000 bytes were transmitted, and at the $2^{nd}$ second 0 bytes were transmitted. Increasing the time the client waits before it reads from its buffer will further diminish the rate of traffic, and vice versa). Once the receiving node's buffer is sufficiently emptied so as to receive new traffic streams from the sending node, the receiving node sends the sending node a message to that effect, pursuant to which the sending node resumes writing data packets into the receiving node's buffer. Thus, when using, the TCP/IP protocol for transferring data, it is possible to control the server-client traffic rate by changing the receiving node's buffer size, and/or the frequency of readings of the data from the receiving node's buffer. The larger the receiving node's buffer is, and the more frequently the receiving node reads from its buffer, the fastest the traffic rate.

Figure 3:
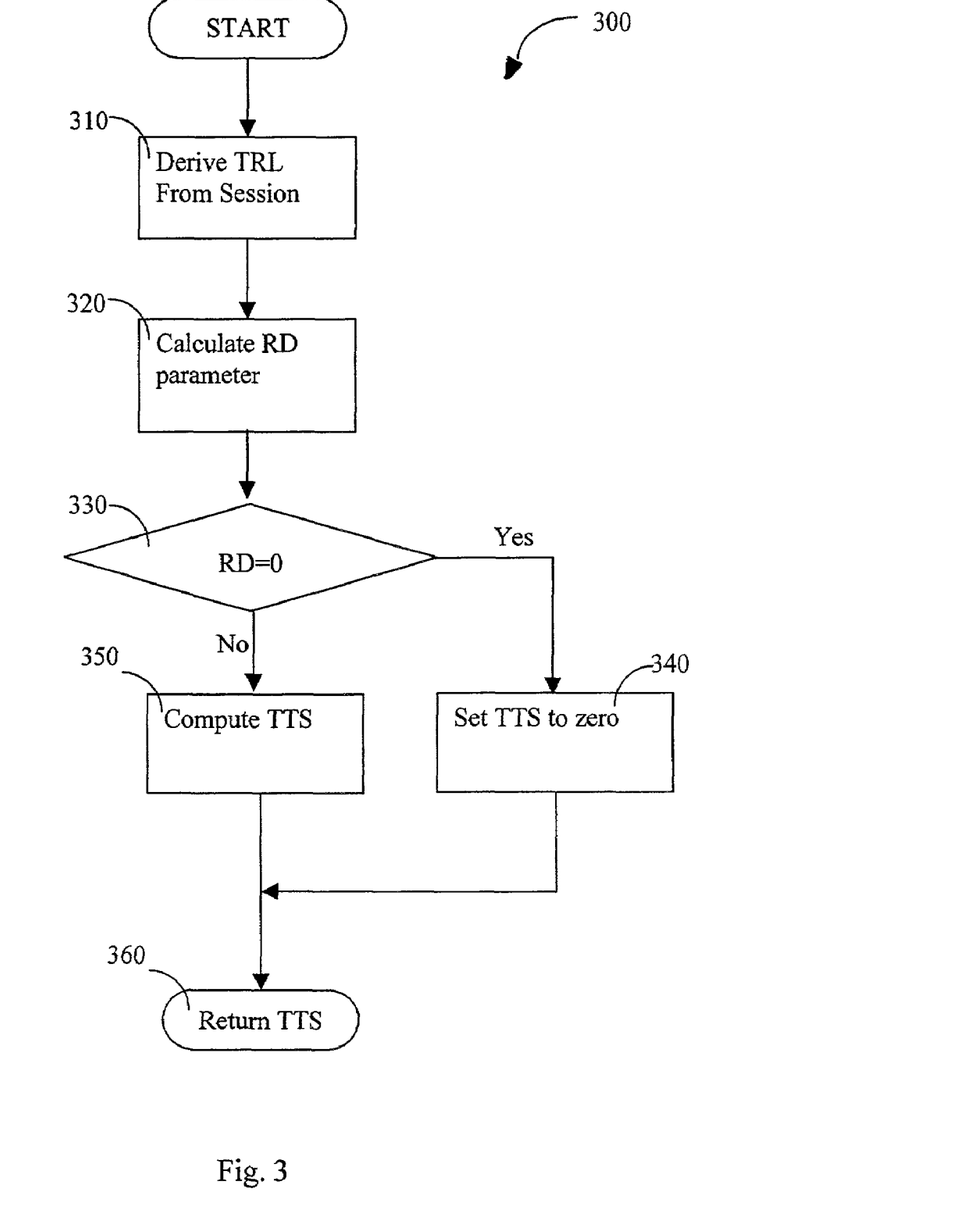
FIG. 3 is a flow chart describing the procedure of computing the time to sleep parameter in accordance with an exemplary embodiment of the present invention.

With reference to FIG. 3, in accordance with an exemplary embodiment of the present invention, traffic node 170 acts as a client in the client-server model, as described hereinabove. The user defines the desired traffic rate at the beginning of the test session, and the purpose of testing system 130 is to maintain a rate of traffic that is equal to the rate of traffic set by the user. To do this, traffic node 170 measures the rate of incoming traffic and compares it with the user defined rate of traffic. Whenever adjustment of the rate of destination server 120 to traffic node 170 traffic is required, algorithm 300 is executed on the traffic node 170 side. Algorithm 300 computes the time that traffic node 170 needs to wait between readings from its buffer ("time to sleep" or "TTS"), thereby increasing or decreasing the rate of destination server 120 to traffic node 170 traffic. The effect on the rate of destination server 120 to traffic node 170 traffic is due to the fact that if traffic node 170 doesn't read from its buffer, and the buffer is full, no transmission from server 120 will occur. Once the no transmission point is reached, the server continues to transmit to traffic node 170 only as often as it receives an indication from traffic node 170 that the traffic node 170 buffer is free. The interval between such indications is the above-mentioned TTS calculated by algorithm 300.

In step 310, traffic node 170 extracts from the session object the desired traffic rate limit (hereinafter "TRL") that was previously input by the user. The TRL defines the maximum traffic rate in which the destination server 120 to traffic node 170 traffic is to be transmitted to traffic node 170; A traffic rate that is slower than the TRL is also acceptable and does not require adjustment. Only if the traffic rate exceeds the TRL is adjustment of the traffic rate by means of algorithm 300 be performed.

In step 320 traffic node 170 calculates the number of bytes that were read from the traffic node's buffer since the previous time the TTS parameter was calculated (hereinafter "read data" or "RD").

In step 330-350 the TTS parameter is calculated based on the RD and TRL parameters derived in steps 310 and 320. In step 330, the RD parameter is checked to see if it equals zero. If so, step 340 occurs, and the TTS is set to equal zero (i.e. there is no pause between the readings of traffic node 170 from traffic node's buffer), which allows for the maximum rate of server120—traffic node 170 traffic.

If, on the other hand, the RD parameter has a value other than zero, then in step 350 the TTS parameter is set to equal |(RD/TLR)-ΔT|, where ΔT is the time interval between the current time at which the TTS parameter is being calculated, and the previous time the TTS parameter was checked. In step 360, procedure 300 returns the TTS parameter.

Figure 4:
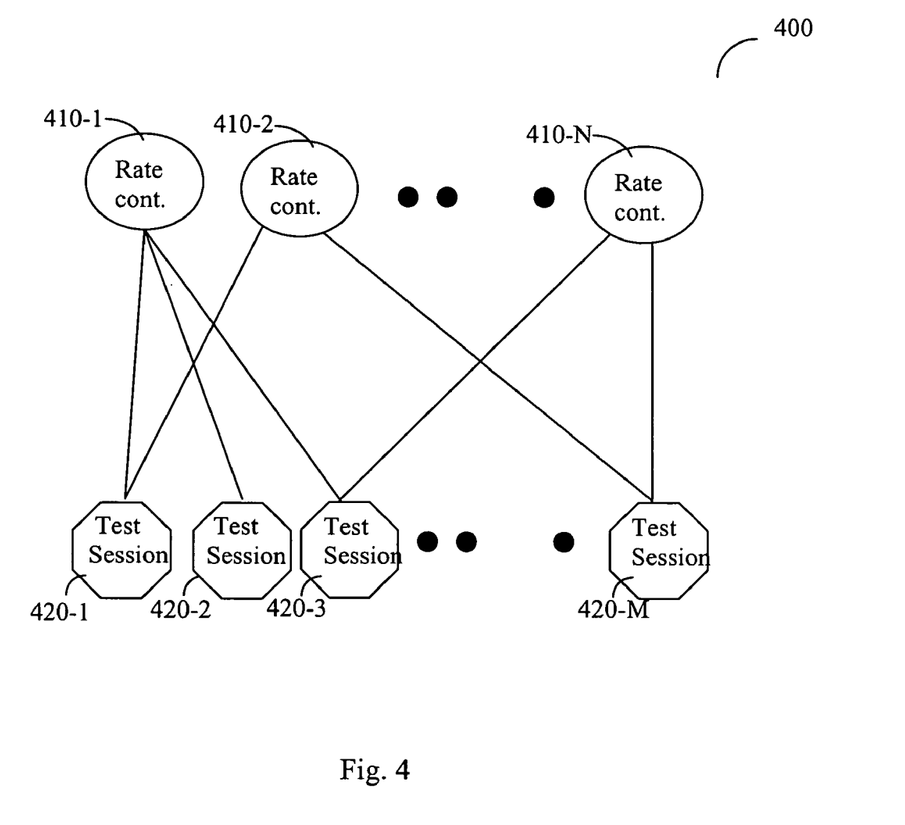
FIG. 4 is a block diagram of tests and rate control objects inheritance structure in accordance with an exemplary embodiment of the present invention.

Referring to FIG. 4, each test session 420 controls its traffic's rate by means of at least one rate control object 410. Rate control object is a software object responsible for determining the TTS parameter, and thereby responsible for controlling the rate of traffic so that it will adhere to the TRL parameter input by the user. Rate control object 410 encapsulates algorithm 300, which is one of the methods of rate control object 410.

In accordance with an exemplary embodiment of the invention, traffic node 170 maintains at least one rate control object 410. Each rate control object 410 can be inherited by an unlimited number of test sessions. FIG. 4 shows N rate control objects $410_{1-N}$ and M test sessions $420_{1-M}$. Whenever traffic node 170 reads data related to one of test sessions $420_{1-M}$ from its traffic node's buffer, rate control object 410 checks for the value of the TTS parameter by means of calling for algorithm 300.

If a traffic node 170 contacts more than one destination server 120 (e.g. if more than one protocol is being tested, in which case a different destination server 120 is contacted for each protocol), then there is more than one server-client test traffic streams, each of whose traffic streams rate needs to be controlled. The rate of each stream is controlled by an independent rate control object 410. One test session 420 calls for more than one rate control objects 410, and consequently, receives more than one returned TTS parameter, one for each destination server 120. Since there is only one traffic node that interacts with the multiple destination servers $120_{1-M}$, and since that traffic node 170 has only one traffic node's buffer, only one TTS can be used. Therefore, once the TTS parameters are received from the various rate control objects 410, traffic node 170 selects the highest TTS parameter returned by the rate control objects 410. The highest returned TTS parameter is selected since, the TRL parameter is actually the maximum traffic rate at which the server to client traffic is to be transmitted to the traffic node, and therefore, by selecting the highest TTS, the lowest common TRL parameter for all traffic node 170—destination server 120 interactions is established.

It should be appreciated that the exemplary embodiment and the embodiments described hereinabove are examples, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description, and which are not disclosed in the prior art, and should therefore only be interpreted by reference to the appended claims.

What is claimed is:

1. A method for testing communications between network components comprising:

defining a test session in which a server is to transmit a traffic stream to a client;

establishing a Transmission Control Protocol (TCP) connection over a network between the client and the server;

transmitting first test traffic from the client to the server over the TCP connection;

receiving in a buffer at the client second test traffic transmitted by the server over the TCP connection in response to the first test traffic; and controlling reading from the buffer by the client so as to cause the server to transmit the second test traffic at a traffic rate that is set by a user.

2. The method according to claim 1, wherein transmitting the first and second test traffic comprises transmitting a request and a response over the TCP connection in accordance with an application-layer protocol.

3. The method according to claim 1, wherein transmitting the first and second test traffic comprises transmitting data packets via a system under test (SUT), and comprising generating a report on performance of the SUT based on the second test traffic received by the client.

4. The method according to claim 1, wherein controlling reading from the buffer comprises controlling a frequency at which the client reads from the buffer.

5. The method according to claim 4, wherein defining the test session comprises defining a maximum allowed traffic rate, and wherein controlling the frequency comprises:

checking an actual rate of transmission of the second test traffic;

if the actual rate is greater than the maximum allowed traffic rate, calculating a waiting time for the client to wait before reading from the buffer so as to cause the actual rate to decrease to the maximum allowed traffic rate;

waiting for the waiting time to elapse; and reading from the buffer after the waiting time has elapsed.

6. The method according to claim 5, wherein calculating the waiting time comprises:

calculating a number of bytes read by the client from the buffer during a time interval;

setting the waiting time to zero if the number of bytes equals zero; and if the number of bytes is not equal to zero, setting the waiting time equal to the number of bytes read by the client, divided by the maximum allowed traffic rate limit less the time interval.

7. The method according to claim 6, wherein the time interval equals an absolute time difference between a current time and a previous time at which the waiting time was calculated.

8. An apparatus for testing communications between network components comprising:

a test manager, which is arranged to define a test session in which a server is to transmit a traffic stream; and a traffic node, which is configured to operate as a Transmission Control Protocol (TCP) client so as to establish a TCP connection over a network with the server, to transmit first test traffic to the server over the TCP connection, to receive in a buffer second test traffic transmitted by the server over the TCP connection in response to the first test traffic, and to control reading from the buffer by the client so as to cause the server to transmit the second test traffic a traffic rate that is set by a user.

9. The apparatus according to claim 8, wherein the first and second test traffic respectively comprise a request and a response in accordance with an application-layer protocol.

10. The apparatus according to claim 8, wherein the traffic node is coupled to transmit the first and second test traffic via a system under test (SUT), and wherein the test manager is arranged to generate a report on performance of the SUT based on the second test traffic received by the traffic node.

11. The apparatus according to claim 8, wherein the traffic node is arranged to cause the server to transmit the second test traffic at the traffic rate that is set by the user by controlling a frequency of reading from the buffer.

12. The apparatus according to claim 11, wherein the test manager is arranged to define a maximum allowed traffic rate, and wherein the traffic node is arranged to control the frequency of reading from the buffer by checking an actual rate of transmission of the second test traffic, and if the actual rate is greater than the maximum allowed traffic rate, calculating a waiting time for the client to wait before reading from the buffer so as to cause the actual rate to decrease to the maximum allowed traffic rate, and to wait for the waiting time to elapse and read from the buffer after the waiting time has elapsed.

13. The apparatus according to claim 12, wherein the traffic node is arranged to calculate the waiting time by calculating a number of bytes read by the client from the buffer during a time interval, setting the waiting time to zero if the number of bytes equals zero, and if the number of bytes is not equal to zero, setting the waiting time equal to the number of bytes read by the client, divided by the maximum allowed traffic rate limit less the time interval.

14. The apparatus according to claim 13, wherein the time interval equals an absolute time difference between a current time and a previous time at which the waiting time was calculated.

15. An apparatus for testing communications between network components stored on a computer-readable media comprising:

means for defining a test session in which a server is to transmit a traffic stream to a client;

means for establishing a Transmission Control Protocol (TCP) connection over a network between the client and the server;

means for transmitting first test traffic from the client to the server over the TCP connection;

means for receiving in a buffer at the client second test traffic transmitted by the server over the TCP connection in response to the first test traffic; and means for controlling reading from the buffer by the client so as to cause the server to transmit the second test traffic at a traffic rate that is set by a user.

* * * * *